Patented June 10, 1924.

1,497,563

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF PURIFYING SODIUM-SULPHIDE SOLUTIONS.

No Drawing.   Application filed March 30, 1922.   Serial No. 548,186.

*To all whom it may concern:*

Be it known that I, HENRY HOWARD, a citizen of the United States, residing at Cleveland, in the county of Cuyahoga and State of Ohio, have invented certain new and useful Improvements in Processes of Purifying Sodium-Sulphide Solutions, of which the following is a specification.

This invention relates to a process of making sodium sulphide and more particularly to a process of recovering sodium sulphide in marketable form from impure, dilute liquors such as are produced in the manufacture of sodium sulphide from sodium sulfate.

According to the well known method of making sodium sulphide, a material containing a sodium salt of sulfuric acid, such as salt cake, is mixed with a carbonaceous fuel and the mixture is heated in a suitable furnace. The product of this treatment is commonly known as sodium sulphide black ash and contains varying quantities of sodium sulphide, sodium carbonate, sodium hyposulfite, sodium sulfate, unconsumed fuel, and ash. The principal constituent of the black ash is sodium sulphide the bulk of which is recovered by leaching. Ordinarily the leaching is carried out in such a way that a strong solution of sodium sulphide is obtained and the bulk of the impurities with considerable sodium sulphide remains in the undissolved residue. This residue is then leached in order to recover the bulk of the sodium sulphide remaining in it. For this purpose leaching with a comparatively large amount of water is necessary and a dilute solution or liquor containing varying quantities of sodium sulphide and water soluble impurities, such as sodium carbonate, sodium hyposulfite, and sodium sulfate, is obtained.

Liquors such as that obtained by the above procedure have been used in various ways, usually for purposes other than the production of sodium sulphide. In order to recover sodium sulphide in a substantially pure state from the liquors it is necessary to remove or destroy the sodium carbonate content. This has been attempted by causticizing the liquors with lime but has resulted in only a partial removal of the sodium carbonate.

I have found that the removal of sodium carbonate may be rendered substantially complete if during causticization with lime, hydrogen sulphide is added to the liquor.

The process is operated as follows:

The sodium carbonate content of the liquor is determined and lime is added in quantity theoretically sufficient to convert the sodium carbonate to sodium hydroxide. Hydrogen sulphide, preferably in the form of a gas, is then added to the liquor in quantity sufficient to convert the sodium hydroxide into sodium sulphide. By operating in this manner it is found that the removal of sodium carbonate is substantially complete and besides the yield of sodium sulphide from the liquor is increased by the amount formed by the action of hydrogen sulphide on the sodium hydroxide.

When the reaction has been completed the solution which is now substantially free from sodium carbonate is separated from the calcium carbonate precipitate. The sodium sulphide may then be recovered from the purified solution in a comparatively pure state by evaporation and crystallization.

While I have described my process as particularly designed for the treatment of dilute liquors resulting from the leaching of sodium sulphide black ash residues it will be apparent that the process is not limited to the treatment of dilute liquors obtained in this particular way. The process is very effective for the removal of sodium carbonate from concentrated solutions containing sodium sulphide and sodium carbonate and is of course applicable to solutions of sodium sulphide containing sodium carbonate regardless of the source of such solutions or the manner in which they are formed.

Instead of treating the liquors with lime and hydrogen sulphide, as described, I may treat the liquors with calcium sulphide, preferably by adding to the liquors a slurry or solution of calcium sulphide.

I claim:

1. Process of purifying a sodium sulphide solution containing sodium carbonate which comprises adding to the solution lime and hydrogen sulphide.

2. Process of removing sodium carbonate from a solution containing the same and sodium sulphide which comprises causticizing the solution with lime in quantity theoretically sufficient to convert the sodium carbonate to sodium hydroxide and adding hydrogen sulphide to the solution in quantity sufficient to convert the sodium hydroxide into sodium sulphide.

3. Process of purifying a solution of sodium sulphide containing sodium carbonate which comprises converting the sodium carbonate to sodium sulphide.

In testimony whereof, I affix my signature

HENRY HOWARD.